(12) United States Patent
He

(10) Patent No.: US 7,957,491 B1
(45) Date of Patent: *Jun. 7, 2011

(54) DIGITAL TECHNIQUE OF COMPENSATING MISMATCHES BETWEEN IN PHASE AND QUADRATURE CHANNELS

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/612,556

(22) Filed: Nov. 4, 2009

Related U.S. Application Data

(63) Continuation of application No. 10/975,594, filed on Oct. 27, 2004, now Pat. No. 7,623,595.

(60) Provisional application No. 60/592,292, filed on Jul. 28, 2004.

(51) Int. Cl.
*H03D 3/00* (2006.01)
*H04L 27/00* (2006.01)
*H04B 1/10* (2006.01)

(52) U.S. Cl. ......... 375/324; 375/235; 375/322; 375/350

(58) Field of Classification Search .................. 375/232, 375/235, 324, 329, 350; 329/304, 306; 708/300, 708/322, 323
See application file for complete search history.

(56) References Cited

U.S. PATENT DOCUMENTS

| 6,785,529 | B2 | 8/2004 | Ciccarelli et al. | |
|---|---|---|---|---|
| 7,024,172 | B1 | 4/2006 | Murphy et al. | |
| 7,061,994 | B2 | 6/2006 | Li et al. | |
| 7,623,595 | B1 * | 11/2009 | He | 375/324 |

OTHER PUBLICATIONS

U.S. Appl. No. 10/975,594, filed Oct. 27, 2004, Office Action mailed Mar. 5, 2008, 15 pages, to be published by the USPTO.
U.S. Appl. No. 10/975,594, filed Oct. 27, 2004, Office Action mailed Sep. 24, 2008, 5 pages, to be published by the USPTO.
U.S. Appl. No. 10/975,594, filed Oct. 27, 2004, Office Action mailed Feb. 11, 2009, 13 pages, to be published by the USPTO.
IEEE Computer Society, "IEEE Standard for Information Technology—Telecommunications and Information Exchange Between Systems—Local and Metropolitan Area Networks-Specific Requirements—Part 3: Carrier Sense Multiple Access with Collision Detection (CSMA/CD) Access Method and Physical Layer Specifications", IEEE Std 802.3—2002, 1538 pages.

* cited by examiner

*Primary Examiner* — Betsy L Deppe

(57) ABSTRACT

Methods and systems for filtering include accessing first and second signals produced from an input signal and producing first and second filtered outputs, which correspond to the first and second signals, based on a filtering characteristic. The filtering characteristic can include a first filtering coefficient weighting the first and second signals. The filtering characteristic can include a second filtering coefficient weighting third and fourth signals, the third and fourth signals being produced prior to the first and second signals. The first and second filtering coefficients can include matrices which have non-symmetrical terms.

21 Claims, 4 Drawing Sheets

DIGITAL TECHNIQUE OF COMPENSATING MISMATCHES BETWEEN IN PHASE AND QUADRATURE CHANNELS

CROSS-REFERENCE TO RELATED APPLICATION

This patent application is a continuation of and claims priority to U.S. application Ser. No. 10/975,594, filed on Oct. 27, 2004, and entitled "DIGITAL TECHNIQUE OF COMPENSATING MISMATCHES BETWEEN IN PHASE AND QUADRATURE CHANNELS", which claims the benefit of the priority of U.S. Provisional Application Ser. No. 60/592,292, filed Jul. 28, 2004 and entitled "IQ Imbalance Compensation".

BACKGROUND

Many different kinds of communication systems, including, but not limited to, direct conversion products such as wireless system receivers, and GSM systems, transmit data using so-called Quadrature Amplitude Modulation, or QAM, over two different out-of-phase channels. These channels are conventionally referred to as the in-phase channel or "I" channel, and the quadrature phase channel or "Q" channel. In such a system, both the in-phase signal, and the 90° out of phase quadrature signal, are used to completely restore a desired signal. Any errors between the matching of the channels can affect the received signal, and hence can cause errors in the received signal.

In receivers of this type, there will always be mismatches between the components used in the I and Q channels. A filter or compensation can be used in an attempt to compensate for the mismatches.

SUMMARY

The present disclosure provides a special filter for correcting for errors caused by mismatches between I and Q channels in such a system.

An aspect defines a filter with a matching coefficient which does not have symmetrical terms.

Another aspect compensates for frequency-dependent errors in the channels.

One aspect defines a filter, that has first and second inputs adapted to receive first and second, substantially out of phase signals, which are mismatched relative to one another, and to produce first and second filtered outputs based on a filtering characteristic, wherein said filtering characteristic is of a form which includes a first filtering coefficient weighting said first and second signals, and a second filtering coefficient, weighting third and fourth signals which were produced at a different time then said first and second signals, and where said first and second filtering coefficients define matrices which have non-symmetrical terms.

The mismatch can be between said I and Q channels as a function of frequency, and the filter corrects for said frequency mismatch.

The filter can include a first local oscillator, generating cos(WcT) for one of said I and Q channels, and a second local oscillator generating sin(WCT) for the other of said I and Q channels.

The filter also includes at least one additional filtering coefficients weighting other, previously-produced signals, wherein there are a total of L different filtering coefficients, each filtering coefficient weighting a previously-produced signal.

The number L of different filtering coefficients is based on a flatness of a frequency response, with a flatter frequency response having a lower L.

The filter can be an adaptive filter that uses least mean squares operation.

According to another aspect, a method, defines receiving a signal which represents first and second out of phase components of a transmission to be received; and filtering the signal to compensate for mismatches between all of: 1) amplitude and phase differences between local oscillators in phase and quadrature components of the channel, and 2) transmission mismatches of the in phase and quadrature components of the channel as a function of frequency.

The filtering can comprise adaptively filtering the signal.

The filtering can comprises filtering the signal using a coefficient that can be expressed as a matrix with non symmetrical terms.

The receiving a signal comprises receiving a reception signal, first processing said reception signal using a first local oscillator to produce a first component, and second processing said reception signal using a second local oscillator to produce a second component which is substantially out of phase with said first component.

The first processing comprises multiplying the reception signal by cosine $W_cT$, and said second processing comprises multiplying the reception signal by sine $W_cT$.

Wherein said filter includes a plurality of filtering coefficients, each weighting a signal value, with at least a plurality of the filtering coefficients weighting previously produced signals, and where there are a total of L different filtering coefficients. A value of L can be selected, wherein said value of L is selected such that a flatter frequency response has a lower L.

Wherein said filtering comprises filtering according to a filtering characteristic of the form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix}$$

where the $H_0$, $H_1$, $H_L$ are of a form with non symmetrical terms.

Wherein $H_i$ is of the form $H(k+1)=H(k)-\mu \cdot E(k) \cdot Y(k)'$, where $\mu$ is a constant, $E(k)$ is the error signal, $Y(k)$ is an input signal, and $Y(k)'$ is a transpose of $Y(k)$.

Wherein said adaptive filter is of the form $H(k+1)=H(k)-\mu \cdot E(k) \cdot Y(k)'$, where $\mu$ is a constant, $E(k)$ is the error signal, $Y(k)$ is an input signal, and $Y(k)'$ is a transpose of $Y(k)$.

Wherein the error signal $E(k)$ is of the form $$E(k) = \begin{bmatrix} \tilde{I}(kT) - I(kT) \\ \tilde{Q}(kT) - Q(kT) \end{bmatrix}$$

where $\tilde{I}(kT)$ is the calculated I output, $I(kt)$ is the actual I output, $\tilde{Q}(kT)$ is the calculated Q output, and $Q(kT)$ is the actual Q output.

BRIEF DESCRIPTION OF THE DRAWINGS

These and other aspects will now be described in detail with reference to the accompanying drawings, wherein.

DETAILED DESCRIPTION

Figure 1:
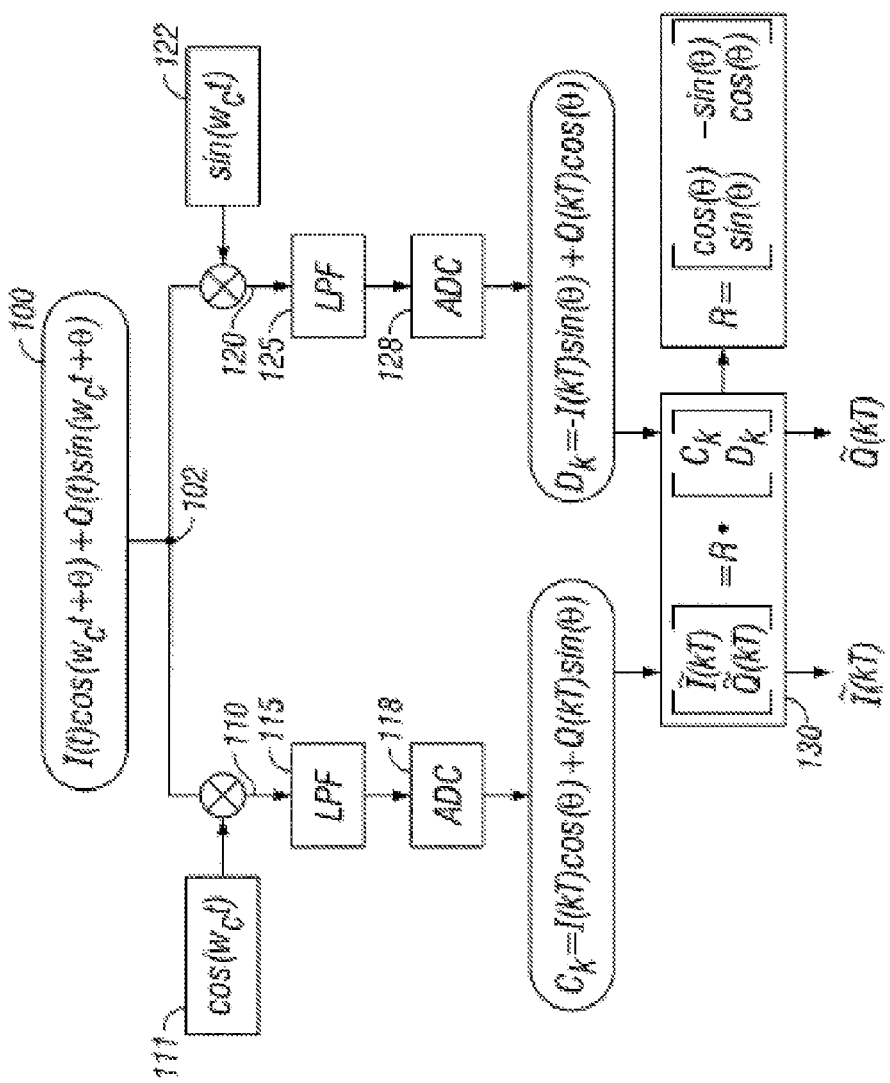
FIG. 1 shows a block diagram of an example receiver which processes I and Q signals for an ideal case that does not have mismatch between I and Q channels.

FIG. 1 shows a block diagram of a receiver which processes I and Q signals. These I and Q signals can, more generally, be any two signals which are out of phase with one another. The receiver, more generally, can receive a first reception signal, which represents the actual signal received over the channel. This reception signal shown as 100, can be represented as:

$$I(t)\cos(w_c t+\theta)+Q(t)\sin(w_c t+\theta) \qquad (1)$$

A node 102 divides into two branches, a so-called in-phase or I branch 110 and a so-called out-of-phase or Q branch 120. The in-phase branch 110 is demodulated, by multiplying by $\cos(w_c t)$, produced by a first local oscillator 111, to represent the cosine portion of the signal 100. In this case, the local oscillator 111 has a frequency equal to the carrier. Analogously, the quadrature branch 120 is formed by multiplying the signal by $\sin(w_c t)$ produced by a second local oscillator 122. Each of the signals are then low pass filtered by low pass filters 115, 125, and then A/D converted by A/D converters 118, 128.

The output from the in-phase branch 110 can therefore be represented as $$C_k = I(kT)\cos(\theta)+Q(kT)\sin(\theta) \qquad (2)$$

While the output from the out-of-phase branch 120 can be represented as $$D_k = -I(kT)\sin(\theta)+Q(kT)\cos(\theta) \qquad (3)$$

Note that each of the signals from each of these branches includes a portion that should really be attributable to the other branch. That portion is typically filtered by a rotator filter 130. The rotator filter 130 uses the transfer function $$\begin{bmatrix} \tilde{I}(kT) \\ \tilde{Q}(kT) \end{bmatrix} = R \cdot \begin{bmatrix} C_k \\ D_k \end{bmatrix} \qquad (4)$$

to produce outputs $\tilde{I}(kT)$ and $\tilde{Q}(kT)$ from the outputs $C_k$ and $D_k$ (where the ~ represents the filtered version). The transfer function may take the form $$R = \begin{bmatrix} \cos(\theta) & -\sin(\theta) \\ \sin(\theta) & \cos(\theta) \end{bmatrix} \qquad (5)$$

or more generally of the form, $e^{j\theta}$. Note that the matrix in equation (5) has symmetric terms, e.g, $\cos(\theta)$ is cross-symmetric with $\cos(\theta)$, and non-symmetric terms, e.g., $-\sin(\theta)$ is non-symmetric with $\sin(\theta)$.

Figure 2:
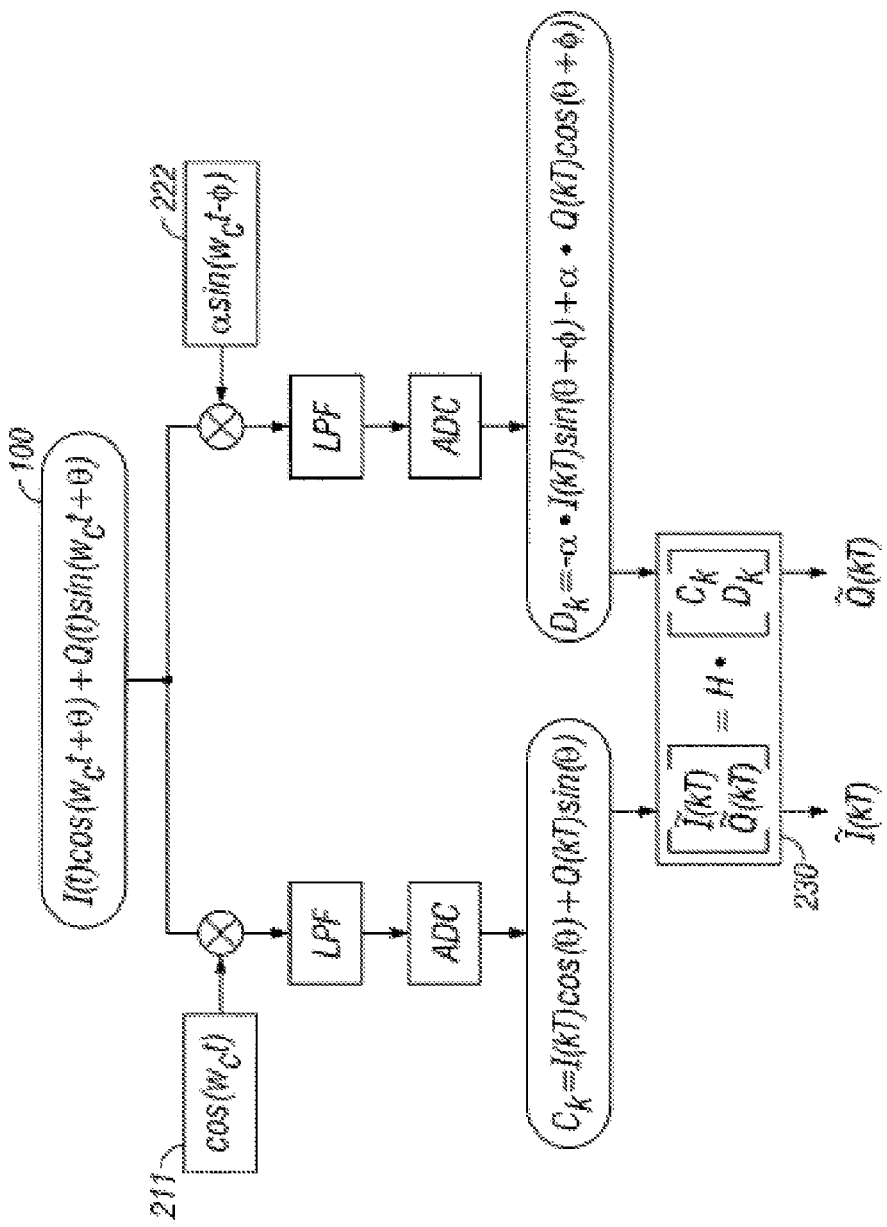
FIG. 2 shows correction of mismatch in a QAM system which takes into account phase and amplitude differences between the local oscillators.

FIG. 2 shows a more practical case which takes into account filtering mismatches. FIG. 2 compensates for the filtering characteristics of the channel, and also for amplitude and phase mismatches between the generators 211, 222. In the FIG. 2 embodiment, the generator 211 generates $\cos(w_c t)$.

However, the generator 222 is not precisely matched to the generator 211, and its output takes the form $$\alpha \sin(w_c t - \phi).$$

Where $\alpha$ represents the amplitude mismatch and $\phi$ represents a phase mismatch relative to generator 211.

The output signals in this more practical case, therefore include $$C_k = I(kT)\cos(\theta)+Q(kT)\sin(\theta) \qquad (6)$$

for the in phase channel, and $$D_k = -\alpha \cdot I(kT)\sin(\theta+\phi)+\alpha \cdot Q(kT)\cos(\theta+\phi) \qquad (7)$$

for the quadrature channel.

The signals are applied to a filter 230 which has the matching function $$\begin{bmatrix} \tilde{I}(kT) \\ \tilde{Q}(kT) \end{bmatrix} = H \cdot \begin{bmatrix} C_k \\ D_k \end{bmatrix} \qquad (8)$$

where the filtering function H has the form $$H = \begin{bmatrix} \cos(\theta+\phi)/\cos(\theta) & -\sin(\theta)/(\alpha\cos(\theta)) \\ \sin[\theta+\phi]/\cos(\theta) & \cos(\theta)/(\alpha\cos(\theta)) \end{bmatrix} \qquad (9)$$

This filtering function H does not have symmetric cross terms and hence can compensate for more general errors.

Figure 4:
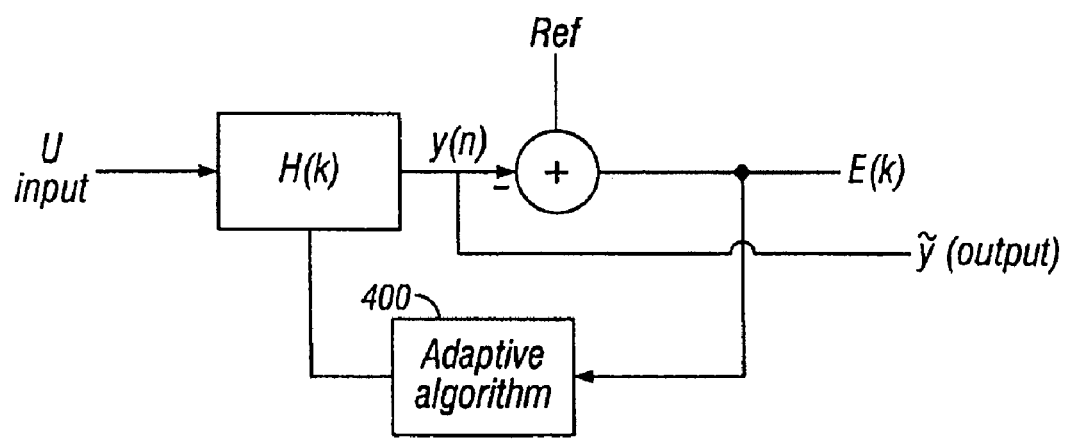
FIG. 4 shows a general adaptive filter.

In an embodiment, H can be an adaptive filter as shown in FIG. 4. The filter mathematically has the form $$H(k+1)=H(k)-\mu \cdot E(k) \cdot [C_k D_k], \text{ where}$$

$$E(k) = \begin{bmatrix} \tilde{I}(kT) - I(kT) \\ \tilde{Q}(kT) - Q(kT) \end{bmatrix} \qquad (10)$$

Where $\mu$ is a constant. Error signal E(k) represents the error between the current signal Y(n) and a reference signal Ref. An adaptive algorithm 400 uses equation (10) to adapt filter coefficients H to minimize the power of the error signal E(k). Different types of adaptive filters are well-known, using, for example, a least mean squares algorithm, and other known techniques.

Figure 3:
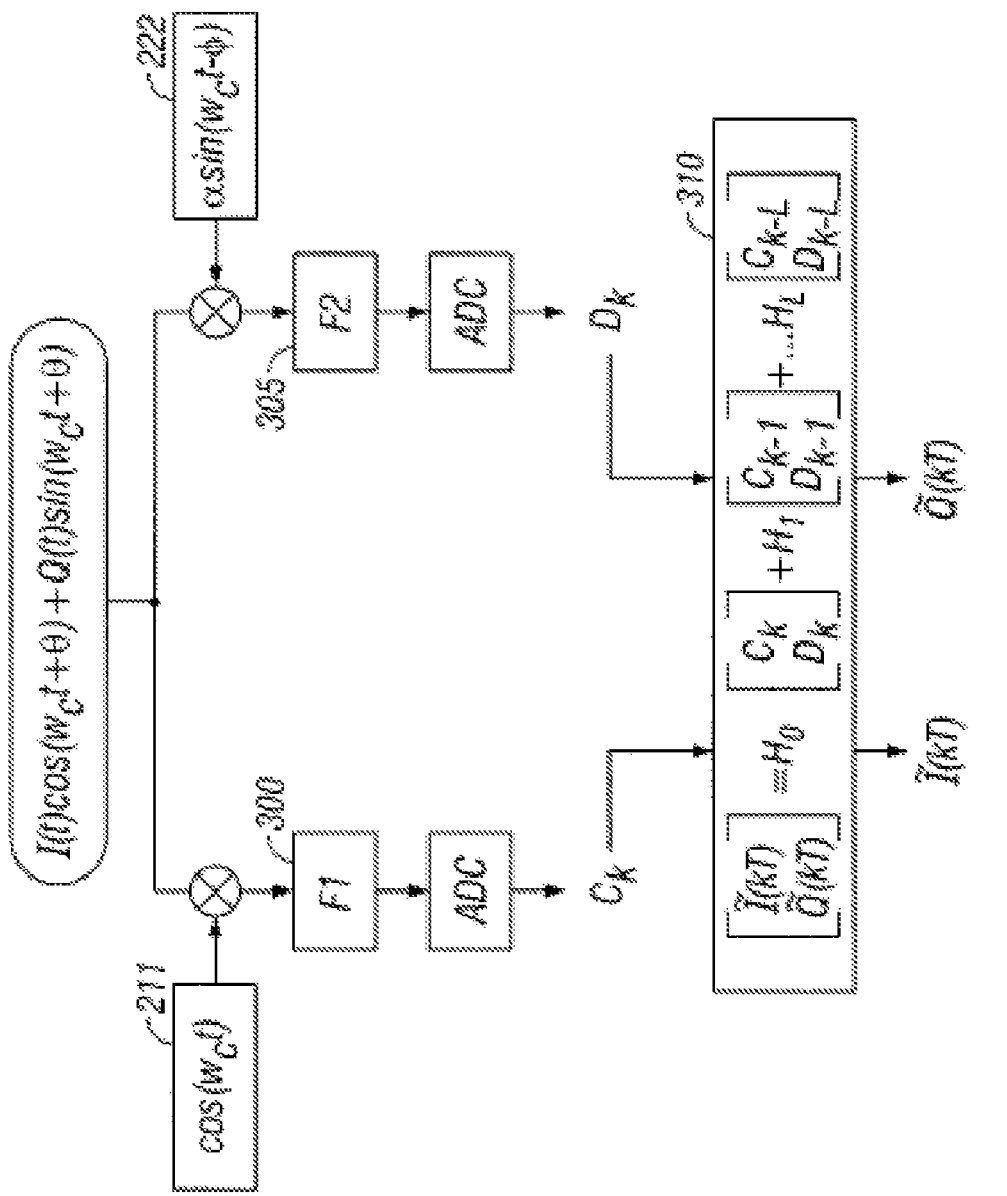
FIG. 3 shows a more general QAM mismatch system which takes into account frequency handling characteristics at various frequencies.

FIG. 3 shows an even more general matching system that compensates for mismatches not only in the channel itself, and in the generators, but also in the frequency handling characteristics between the channels. This may include, for example, the low pass filters 115, 125 in FIG. 1 as well as the characteristics of the channel at different frequencies. The mismatches between the channels are shown generically in FIG. 3 as 300, 305, where the in-phase channel has the frequency characteristic F1, and the out of phase channel has the frequency characteristic F2.

A special adaptive compensation filter 310 is used. The compensation filter has the transfer function $$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix}$$

in order to correct for these values. In this adaptive mismatch compensation, the $H_i$ function is a 2×2 matrix. A classic adaptive filter uses previous values and errors to form coefficients to correct the current values. This improved matching uses an adaptive system which uses multiple different previous values, here L of those values extending back in time by L time periods. L may be selected based on the flatness of the frequency for the bandwidth of interest, where a flatter frequency may have a smaller L. An exemplary value of L, for example, may be 20.

The correction value H is actually formed of an array, therefore $$H=[H_0 H_1 \ldots H_L] \quad (13)$$

Here, where the array is of dimension $$H:2\times(2\cdot(L+1)) \quad (14)$$

the input value used by the array is of the form $$Y=[C_k,D_k,C_{k-1},D_{k-1},\ldots C_{k-L},D_{k-L}]', \text{ where } Y:(2\cdot(L+1))\times 1 \quad (15)$$

This adaptive filter, therefore follows the equation $$H(k+1)=H(k)-\mu\cdot E(k)\cdot Y(k)' \quad (16)$$

Where $\mu$ is a constant, $E(k)$ is the error signal, and $Y(k)'$ is the transpose of $Y(k)$. The error signal for the adaptive filter is calculated as $$E(k) = \begin{bmatrix} \tilde{I}(kT) - I(kT) \\ \tilde{Q}(kT) - Q(kT) \end{bmatrix} \quad (17)$$

An important feature of this system, is that the correction factor is not a complex number of the form $h_i=a_i+jb_i$, which would have the form $$h_i = \begin{bmatrix} a_i & -b_i \\ b_i & a_i \end{bmatrix}$$

Rather, here, the matching value does not have symmetric terms in its matrix. This more powerful correction allows the filter to correct for combinations of different mismatches within the system.

For example, the filter of this type may correct for multiple ones of phase and amplitude differences between the local oscillators, as well as frequency mismatches of channel characteristics.

The above system describes a filter which may be used in any kind of communication product. The filter can be effected in software, that is executed on a programmable processor of any type, such as a general-purpose processor, or a digital signal processor which is also carrying out some other function. The software can also be executed on a simulation system, such as MATLAB™. The filter can alternatively be effected in hardware, such as using dedicated circuitry defined using hardware definition language, or by a suitably programmed field programmable gate array or in an application specific integrated circuit.

This circuit may be used as part of any type of communication equipment, such as a cellular telephone, a network communication part such as a modem or wireless network device, or any other device that communicates data or other information, either digitally or in analog form. Most specifically, however, this may find application in an "direct conversion" type receiver that operates without a local oscillator. For example, this may be used in a CDMA, GSM or other telephone, or the like.

Although only a few embodiments have been disclosed in detail above, other modifications are possible. All such modifications are intended to be encompassed within the following claims, in which:

What is claimed is:

1. An apparatus, comprising:
   circuitry configured to access first and second signals produced from an input signal, the first and second signals being out-of-phase and mismatched relative to one another; and
   circuitry configured to produce first and second filtered outputs, which correspond to the first and second signals, based on a filtering characteristic, wherein the filtering characteristic is of a form that includes: a first filtering coefficient weighting the first and second signals, and a second filtering coefficient weighting third and fourth signals, the third and fourth signals being produced prior to the first and second signals, wherein the first and second filtering coefficients respectively comprise matrices which have non-symmetrical terms.

2. The apparatus of claim 1, further comprising:
   circuitry configured to produce the first signal on an in-phase channel based on the input signal; and
   circuitry configured to produce the second signal on a quadrature channel based on the input signal,
   wherein the mismatch is between the in-phase and quadrature channels as a function of frequency, wherein the filtering characteristic corrects for at least a frequency mismatch.

3. The apparatus of claim 2, further comprising:
   a first oscillator to generate $\cos(w_c t)$ for the in-phase channel; and
   a second oscillator to generate $\sin(w_c t)$ for the quadrature channel,
   wherein $w_c$ represents a carrier frequency.

4. The apparatus of claim 1, wherein the filtering characteristic is of a form which includes one or more additional filtering coefficients weighting respective one or more additional previously produced signals, wherein the filtering characteristic includes a total of number L different filtering coefficients, wherein the number L different filtering coefficients is based on a flatness of a frequency response, with a flatter frequency response having a lower L.

5. The apparatus of claim 1, wherein the filtering characteristic is of the form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein $H_0$ represents the first filtering coefficient, wherein L represents the number of additional filtering coefficients being inclusive of the second filtering coefficient, wherein H1, ..., HL respectively represent the additional filtering coefficients being inclusive of the second filtering coefficient, wherein and represent the first and second signals respectively, wherein Ck-1, ..., Ck-L represent previously produced signals, wherein Dk-1, ..., Dk-L represent previously produced signals that are out-of-phase with respect to corresponding ones of $C_{k-1}$, ..., Ck-L, wherein $\tilde{I}(kT)$ represents the first filtered output and $\tilde{Q}(kT)$ represents the second filtered output.

6. The apparatus of claim 5, further comprising:
   circuitry to update one or more filtering coefficients to minimize a power of an error signal, wherein the error signal is based on the first and second filtered outputs and first and second signal references.

7. The apparatus of claim 6, wherein the error signal, E(k), is of a form:

$$E(k) = \begin{bmatrix} \tilde{I}(kT) - I(kT) \\ \tilde{Q}(kT) - Q(kT) \end{bmatrix},$$

wherein I (kT) represents the first signal reference and Q(kT) represents the second signal reference.

8. The apparatus of claim 1, wherein the mismatch comprises a phase mismatch and an amplitude mismatch, wherein the circuitry configured to produce the first and second filtered outputs comprises at least a portion of the circuitry configured to access the first and second signals.

9. A method, comprising:
accessing first and second signals produced from an input signal, the first and second signals being out-of-phase and mismatched relative to one another; and
producing first and second filtered outputs, which correspond to the first and second signals, based on a filtering characteristic, wherein the filtering characteristic is of a form which includes: a first filtering coefficient weighting the first and second signals, and a second filtering coefficient weighting third and fourth signals, the third and fourth signals being produced prior to the first and second signals, wherein the first and second filtering coefficients respectively comprise matrices which have non-symmetrical terms.

10. The method of claim 9, comprising:
producing the first signal of an in-phase channel based on the input signal; and
producing the second signal of a quadrature channel based on the input signal,
wherein the mismatch includes a frequency mismatch between the in-phase and quadrature channels as a function of frequency, and producing the first and second filtered outputs comprises correcting for the frequency mismatch.

11. The method of claim 10, comprising:
receiving an input signal associated with a carrier frequency, $w_c$,
wherein producing the first signal of the in-phase channel comprises applying a signal of a form $\cos(w_c t)$ to the input signal,
wherein producing the second signal of the quadrature channel comprises applying a signal of a form $\sin(w_c t)$ to the input signal.

12. The method of claim 9, wherein producing the first and second filtered outputs comprises using one or more additional filtering coefficients weighting respective one or more additional previously produced signals, wherein the filtering characteristic includes a total of number L different filtering coefficients, wherein the number L different filtering coefficients is based on a flatness of a frequency response, with a flatter frequency response having a lower L.

13. The method of claim 9, wherein producing first and second filtered outputs comprises using a form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein H0 represents the first filtering coefficient, wherein L represents the number of additional filtering coefficients being inclusive of the second filtering coefficient, wherein H1, . . . , HL respectively represent the additional filtering coefficients being inclusive of the second filtering coefficient, wherein and represent the first and second signals respectively, wherein Ck-1, . . . , Ck-L represent previously produced signals, wherein Dk-1, . . . , Dk-L represent previously produced signals that are out-of-phase with respect to corresponding ones of $C_{k-1}$, . . . , Ck-L, wherein $\tilde{I}$(kT) represents the first filtered output and $\tilde{Q}$(kT) represents the second filtered output.

14. The method of claim 13, comprising:
updating one or more filtering coefficients to minimize a power of an error signal, wherein the error signal is based on the first and second filtered outputs and first and second signal references.

15. The method of claim 14, wherein updating one or more filtering coefficients comprises computing the error signal, E(k), based on a form:

$$E(k) = \begin{bmatrix} \tilde{I}(kT) - I(kT) \\ \tilde{Q}(kT) - Q(kT) \end{bmatrix},$$

wherein I (kT) represents the first signal reference and Q(kT) represents the second signal reference.

16. A system, comprising:
circuitry configured to access first and second signals produced via an in-phase channel and a quadrature channel, respectively, from an input signal, the first and second signals being out-of-phase and mismatched relative to one another; and
processor circuitry configured to filter the first and second signals to compensate for mismatches between amplitude and phase differences between the in-phase and quadrature channels, wherein the processor circuitry is configured to use multiple filtering coefficients to weight multiple previously obtained signals over the in-phase and quadrature channels.

17. The system of claim 16, comprising:
receiver circuitry to receive the input signal; and
demodulator circuitry to produce signals on the in-phase channel and the quadrature channel based on the input signal.

18. The system of claim 17, wherein the demodulator circuitry comprises:
a first oscillator to generate $\cos(w_c t)$ for the in-phase channel; and
a second oscillator to generate $\sin(w_c t)$ for the quadrature channel,
wherein $w_c$ represents a carrier frequency.

19. The system of claim 16, wherein the processor circuitry is configured produce first and second filtered outputs using a form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein H0 represents a first filtering coefficient, wherein L represents the number of additional filtering coefficients, wherein H1, . . . , HL respectively represent the additional filtering coefficients, wherein and represent the first and second signals respectively, wherein Ck-1, ..., Ck-L represent previously produced signals, wherein Dk-1, ..., Dk-L represent previously produced signals that are out-of-phase with respect to corresponding ones of Ck-1, ..., Ck-L, wherein $\tilde{I}(kT)$ represents a first filtered output and $\tilde{Q}(kT)$ represents a second filtered output.

20. The system of claim 19, wherein the processor circuitry is configured to update one or more filtering coefficients to minimize a power of an error signal, wherein the error signal is based on the first and second filtered outputs and first and second signal references.

21. The system of claim 20, wherein the processor circuitry is configured to compute the error signal, E(k), based on a form:

$$E(k) = \begin{bmatrix} \tilde{I}(kT) - I(kT) \\ \tilde{Q}(kT) - Q(kT) \end{bmatrix},$$

wherein I (kT) represents the first signal reference and Q (kT) represents the second signal reference.

* * * * *